United States Patent [19]

Matsui et al.

[11] 3,861,712

[45] Jan. 21, 1975

[54] APPARATUS FOR DEFLATING AN INFLATABLE OCCUPANT RESTRAINT DEVICE

[75] Inventors: Shunji Matsui; Yoshikazu Hayakawa; Kenzo Hirashima, all of Yokohama, Japan

[73] Assignee: Nissan Motor Company, Ltd.

[22] Filed: Aug. 4, 1971

[21] Appl. No.: 168,819

[30] Foreign Application Priority Data

Dec. 28, 1970 Japan.............................. 45-119425
Dec. 28, 1970 Japan.............................. 45-132109

[52] U.S. Cl. ............ 280/150 AB, 137/68, 182/137
[51] Int. Cl. ............................................. B60r 21/08
[58] Field of Search ........... 280/150 AB; 137/67, 68

[56] References Cited
UNITED STATES PATENTS

| | | | |
|---|---|---|---|
| 2,736,459 | 2/1956 | Cockram et al. ..................... | 137/68 |
| 2,834,606 | 5/1958 | Bertrand...................... | 280/150 AB |
| 2,834,609 | 5/1958 | Bertrand...................... | 280/150 AB |
| 2,972,998 | 2/1961 | Detwiler ............... | 137/68 |
| 3,370,886 | 2/1968 | Frost ........................... | 280/150 AB |
| 3,481,625 | 12/1969 | Chute.......................... | 280/150 AB |
| 3,532,358 | 10/1970 | Selwa et al. .................. | 280/150 AB |
| 3,547,467 | 12/1970 | Pociask ....................... | 280/150 AB |
| 3,618,974 | 11/1971 | Chute........................... | 280/150 AB |

FOREIGN PATENTS OR APPLICATIONS

| | | | |
|---|---|---|---|
| 896,312 | 11/1953 | Germany...................... | 280/150 AB |
| 953,312 | 3/1964 | Great Britain................ | 280/150 AB |

Primary Examiner—David Schonberg
Assistant Examiner—John P. Silverstrim
Attorney, Agent, or Firm—Robert E. Burns; Emmanuel J. Lobato; Bruce L. Adams

[57] ABSTRACT

A gas bag type safety device having an inflatable confinement which is expanded to a protective condition at the time of a collision the inflated confinement being adapted to be gradually deflated upon being hit by the vehicle occupants so as to reduce an otherwise large repulsive force tending to bounce the occupants violently back against the seats or other structural parts of the vehicle. Such deflation of the inflated confinement is effected through an exhaust duct having its outlet outside of the passenger compartment. The outlet is closed by a cover which opens after a given time interval from the moment of triggering off the inflation of the confinement which cover opens substantially at the same time as the occupants hit the inflated confinement. Instead of a cover one or more membranes can be used which rupture at the time when the occupants hit the inflated confinement.

2 Claims, 10 Drawing Figures

APPARATUS FOR DEFLATING AN INFLATABLE OCCUPANT RESTRAINT DEVICE

This invention relates generally to motor vehicle safety devices, and more particularly to improvements in gas bag type safety devices capable of protecting the vehicle occupants from possible injury caused by a collision.

As is well known, a gas bag type safety device has an inflatable confinement which is normally stored in a folded condition in the motor vehicle and which is automatically expanded to a protective condition immediately after the vehicle is subjected to a sudden impact due to a collision with another vehicle or a structure in the path of vehicle advance. In such a protective condition, the inflatable confinement receives and secures in place the vehicle occupants which are violently thrown forward due to the strong force of inertia exerted on them. However, if the confinement fails to be properly deflated and still remains in fully expanded condition at the very moment when the impact on the occupants has been absorbed by the confinement, then the occupants are violently bounced back against the seats or other structural parts of the vehicle due to the repulsive force developed by the confinement. This may cause critical injuries to the occupants. Thus, it is of prime importance that the inflatable confinement be deflated properly and timely, and it has been proposed to allow a portion of the inflating gas gradually to be let out through the cloth of which the confinement is made, so that the major portion of the impact energy is absorbed when the vehicle occupants strike the inflated confinement but deflation takes place during the impact absorption so that the occupants are not bounced back after the absorption is completed. However, since the inflating gas contains toxic substances such as hydrogen sulphide, sulphurous acid gas, nitrogen oxides and carbon monoxide (where liquid fluorocarbon, which is sold under the trade-mark "Freon," is vaporized through detonation of explosives) or a large amount of nitrogen (where a pressurized nitrogen gas is used to inflate the confinement), there is a possibility of the vehicle occupants being choked by such toxic gases released into the passenger compartment.

It is therefore an object of this invention to provide an improved gas bag type safety device with a view to overcome the above-said disadvantages.

It is another object of this invention to provide an improved gas bag type safety device which includes an exhaust duct through which the operating gas is let off when the vehicle occupants strike the inflated confinement.

It is a further object of this invention to provide an improved gas bag type safety device in which the inflating gas is exhausted not to the passenger compartment but to the outside of the passenger compartment.

It is still a further object of this invention to provide an improved gas bag type safety device including a closure member which is adapted to be automatically removed from the exhaust duct so as to open it at a predetermined time after the gas bag inflating substance is vaporized to generate the operating gas.

It is yet a further object of this invention to provide an improved gas bag type safety device including a membrane or membranes provided on the exhaust duct so as seal it, which membranes are broken or ruptured due to the increase in the pressure within the inflatable confinement when the vehicle occupants strike the confinement.

In the accompanying drawings.

In the drawings like numerals and characters are assigned to like parts and elements and it is understood that phrases like "left, right, upward etc." refer only to the drawings and not necessarily to the actual movements or locations of parts and elements in assemblies etc.

Figure 1:
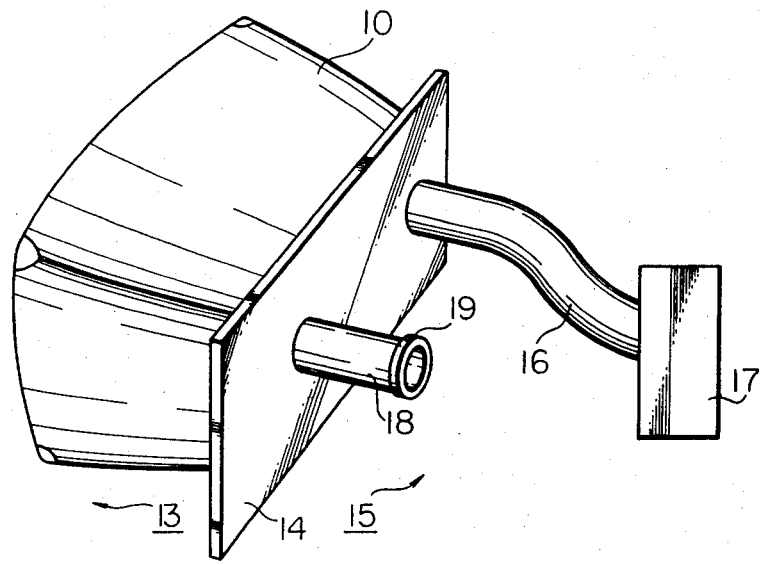
FIG. 1 is a schematic perspective view of the gas bag type safety device according to this invention.
Figure 2:
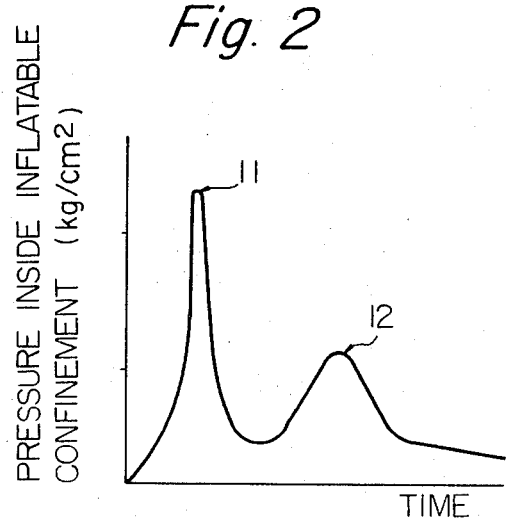
FIG. 2 is a graphic representation showing the manner in which the pressure within the inflatable confinement varies once the safety device is triggered off.

Referring now to the drawings and particularly to FIG. 1, there is shown a gas bag type safety device having an inflatable confinement 10 which is frequently called the gas bag or safety cushion. Before describing more specifically embodiments of this invention, it will be helpful to discuss the manner in which the pressure within the inflatable confinement 10 varies once the safety device is triggered off. As will be apparent from the graphic representation of FIG. 2, the pressure instantaneously rises to a first peak value 11, since the confinement 10 in a folded condition has only a small inside space into which the inflating gas is forced. The pressure remains at the first peak value 11 for an extremely short time such as 1 - 2 milli seconds and then decreases due to the fact that the confinement 10 is unfolded. The first peak value 11 is approximately 1 kg/cm² above atmospheric pressure. Thereafter, the pressure is again increased to a second peak value 12 of the order of 0.6 kg/cm² above atmospheric pressure by the succeeding inflow of the inflating gas. According to this invention, the inflated confinement 10 is gradually-deflated, deflation beginning of the second peak 12 to decrease the repulsive force developed by the confinement 10 upon conpletion of absorption of the impact on the vehicle occupants, so that the occupants are not violently bounced back against the seats or other structural parts of the vehicle (not shown).

The inflatable confinement 10 is mounted in the passenger compartment 13 on a plate member 14 serving as a partition between the compartment 13 and the engine room 15. A duct 16 extends through the plate member 14 into the inflatable confinement 10 to convey the inflating gas from a gas source 17 into the inflatable confinement 10. The gas source 17 is of a conventional type including a gas bag inflating substance such as liquid fluoro-carbon sold under the trademark "Freon" and a detonation device (not shown). Another duct or an exhaust duct 18 extends through the plate member 14 into the inflatable confinement 10 and has a suitable fastening member such as a flange 19 integrally formed at the outlet thereof. The cross-sectional area of the duct 18 is selected to allow gradual deflation of the inflated confinement 10.

Figure 3:
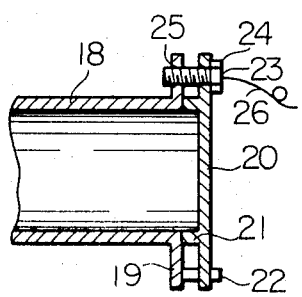
FIG. 3 is a longitudinal section of an exhaust duct shown in FIG. 1, to which a closure member is removably mounted.
Figure 4:
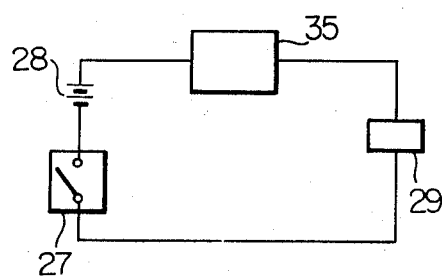
FIG. 4 is a circuit diagram of an triggering circuit used to release the gas bag inflating substance and to actuate the removal of the closure member.
Figure 5:
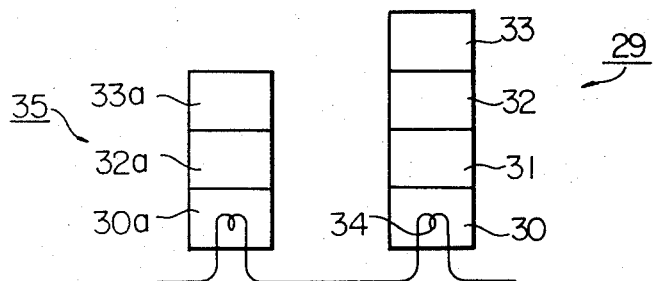
FIG. 5 is a schematic view of triggering units containing explosives shown in FIG. 4.

According to a first embodiment of this invention, there is provided a closure member 20 for normally sealing the exhaust duct 18, which member 20 is adapted to be automatically removed at a predetermined time after the safety device is triggered off. As is shown in FIG. 3, the closure member 20 includes a circular protuberance 21 having substantially the same diameter as the exhaust duct 18 and is placed on the flange 19 in alignment with the exhaust duct 18. A pin 22 is provided near the circumference of the closure member 20 to secure it to the flange 19. A fastening means such as a bolt 23 and a nut 24 are provided for the closure member 20 at a position substantially circumferentially opposite to the pin 22. The bolt 23 has an electrically actuable detonation element (not shown) provided therein and extends through an opening 25 formed in the flange 19 for normally securing the closure member 20 to the exhaust duct 18. The electrically actuable detonation element has a lead or leads 26 extending therefrom to triggering circuit diagrammatically shown in FIG. 4 and is adapted to explode to allow the closure member 20 to be removed from the exhaust duct 18 upon being triggered off by the circuit. The triggering circuit includes an impact sensor of a conventional type having a switch 27 which is closed when the vehicle is subjected to a sudden impact caused by a collision. The switch 27 is connected at one contact to a battery 28 and at the other to a triggering means 29 which is inserted into the detonation element. The triggering means 29, as shown in FIG. 5, comprises four layers formed of a fulminating powder layer 30, an explosion delaying layer 31, an initiator layer 32 and a main explosive layer 33 in this order. The fulminating powder layer 30 has a nichrome wire 34 embedded therein. The triggering means 29 in turn is connected to another triggering means 35 which is provided in the gas source 17 to release the gas bag inflating substance such as "Freon." The triggering means 35 is similar in construction to the triggering means 29 except that the explosion delaying layer 31 is omitted. The triggering means 35 is connected to the battery 28. With this arrangement, if the switch 27 of the impact sensor is closed due to a sudden impact resulting from a collision, then the fulminating poweder layers 30, 30a of the triggering means 29, 35 simultaneously set off, so that the gas bag inflating substance in the gas source 17 is released to inflate the confinement 10 and the detonation element explodes removing the closure 20. However, since the triggering means 29 for the detonation element includes the explosion delaying layer 31, the explosion of the detonation element occurs at a predetermined time after the bag inflating substance is released. The predetermined time interval is dependent on the selected delaying value of the explosion delaying layer 31. It is preferable that the predetermined time be selected so that the explosion of the detonation element and the beginning of deflation coincide with the vehicle occupants striking the inflataed confinement 10. By so doing, the major portion of the impact energy is absobed by the gradually deflating confinement 10, and the vehicle occupants are not violently bounced back against the seats or other structural portions of the vehicle.

Figure 6:
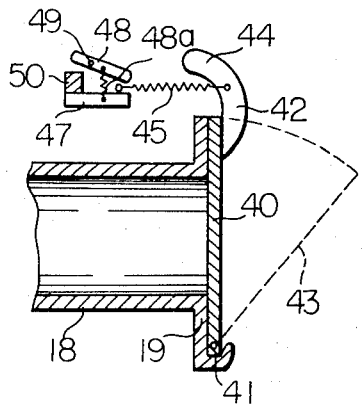
FIG. 6 is a view similar to FIG. 3, but showing another embodiment of this invention.

According to a second embodiment of this invention, there is provided a closure member 40 which is hingedly mounted on the flange 19 of the exhaust duct 18 at 41, as is shown in FIG. 6. The closure member 40 is normally forced against the flange 19 by a fastening member such as an arcuate arm 42 to hermetically seal the exhaust duct 18 and is automatically rotated in a clockwise direction to a position shown by a broken line 43 at a predetermined time after the safety device is triggered off. The arcuate arm 42 is rotatably supported by a pin 44 which is provided near the periphery of the flange 19 substantially circumferentially opposite to the hinged portion. A spring 45 is provided having one end secured to the intermediate portion of the arcuate arm 42 to urge it in a clockwise direction thereby forcing the closure member 40 against the flange 19 of the exhaust duct 18. The other end of the spring 45 is held on a support plate 47 by one end of an arm 48 which is biased for rotation about a pin 49 in a clockwise direction by a spring 48a. The support plate 47 is provided with an electromagnet 50 adapted to apply an attracting force on the other end of the arm 48 when the electromagnet 50 is energized. The application of the attracting force on the arm 48 will cause it to rotate in a counterclockwise direction to release the other end of the spring 45. When this occurs, the spring force urging the arcuate arm 42 in a clockwise direction is eliminated and the closure member 40 is rotated in a clockwise direction, by the pressure exerted thereon by the inflating gas.

Figure 7:
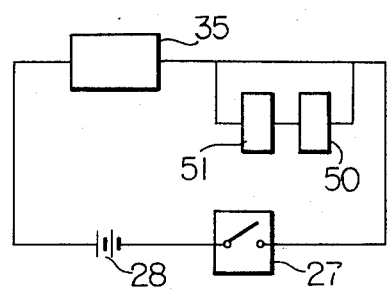
FIG. 7 is a view similar to FIG. 4, but showing a triggering circuit to be used with the embodiment of FIG. 6.

An electric circuit for triggering off the gas bag inflating substance in the gas source 17 upon closure of the impact sensor switch 27 and for energizing the electromagnet 50 at a predetermined time after the triggering off of the gas bag inflating substance is shown in FIG. 7. In this circuit, the triggering means 29 of FIG. 5 is replaced by a series combination of a suitable delay circuit 51 and the electromagnet 50. With this arrangement also, the closure member 40 is rotated to open the exhaust duct 18 at a predetermined time after the safety device is triggered off, that is, substantially at the same time the vehicle occupants hit the gradually deflating inflated confinement 10 and the vehicle occupants are not violently bounced back against the seats or other structural parts of the vehicle.

Figure 8:
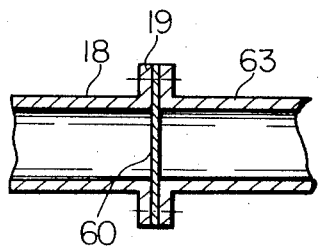
FIGS. 8 through 10 are longitudinal sections of the exhaust ducts and membranes provided therein and on outlets thereof according to forms of a further embodiment of this invention.

According to a third embodiment of this invention, there is provided a membrane 60 on the flange 19 so as to seal the exhaust duct 18, as is shown in FIG. 8. The membrane 60 comprises a sheet of any suitable material that is capable of resisting a pressure of up to a predetermined magnitude exerted thereon without being broken or ruptured. Thus, by selecting the predetermined magnitude below the second peak value 12 as shown in FIG. 1, it is possible to have the membrane 60 broken or ruptured at the time when the vehicle occupants hit the inflated confinement 10 and the pressure within the confinement 10 is again increased. With the membrane 60 broken or ruptured, the operating gas starts escaping from the confinement 10 through the exhaust duct 18, so that the pressure within the confinement 10 decreases to such a level as to fail to develop an otherwise large repulsive force tending to bounce the vehicle occupants violently back against the seats or other structural parts of the vehicle.

Figure 9:
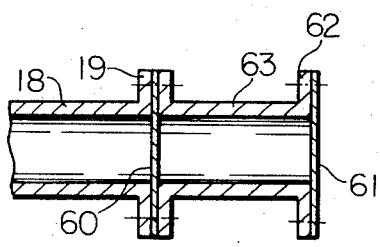

Since, however, the pressure inside the confinement 10 instantaneously increases to the first peak value 11 higher than the second peak 12 before reaching the second peak, there is a possibility of the membrane 60 being broken or ruptured in the neighbourhood of the first peak value 11. To eliminate this possibility, it is preferable to provide the exhaust duct 18 with an auxiliary membrane 61 which has the capacity of resisting a pressure substantially equal to or slightly lower than that of the membrane 60. The auxiliary membrane 61, as is shown in FIG. 9, is mounted on a flange 62 integrally formed in an extension duct 63 which in turn is secured to the flange 19 of the exhaust duct 18 with the membrane 60 interposed therebetween. Since the rupture of the membrane 60 lags behind the first peak value 11 for an extremely short time due to the ductility of the material of which the membrane 60 is made, so that the pressure exerted on the auxiliary membrane 61 is smaller than the first peak value 11, the auxiliary membrane 61 is not ruptured simultaneously with the rupture of the membrane 60, but it is ruptured at the second peak 12, that is, at the time when the vehicle occupants hit the inflated confinement 10.

Figure 10:
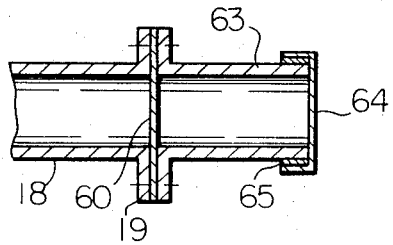

It is also possible to employ a cap member 64 in place of the auxiliary membrane 61, as is shown in FIG. 10. The cap member 64 is secured to the end of the duct 63 opposite to the membrane 60 so as to seal the duct 63 through the use of a fastening buffer member 65. The member 65 offers similar pressure resistance as membrane 61. When the vehicle occupants hit the inflated confinement 10, the cap member 64 is automatically removed from the duct 63 due to the increase in the pressure within the confinement 10.

As has been described above, this invention provides an improved gas bag type safety device having an inflatable confinement which is adapted to be gradually deflated after inflation through an exhaust duct upon being hit by the vehicle occupants so as to reduce an otherwise large repulsive force tending to bounce the vehicle occupants violently back against the seats or other structural parts of the vehicle.

What is claimed is:

1. In a motor vehicle safety device having an inflatable confinement which is normally stored in a folded condition and is inflatable to a protective condition by a vaporized gas upon triggering said safety device in response to a sudden impact, in which pressure in the interior of the inflated confinement reaches a first peak value at the time of triggering the safety device while reaching a second peak value at a predetermined time after triggering the safety device, substantially at which a vehicle occupant crashes against the inflated confinement: apparatus for exhausting the fluid from the confinement comprising: an exhaust duct communicating with said confinement to gradually discharge the vaporized gas from the inflated confinement; a closure member removably secured to an outlet of said exhaust duct for closing same and preventing exhausting of said vaporized gas during inflation of said confinement; means for removing said closure member away from said outlet to open said exhaust duct at said given time after triggering said safety device so as to deflate the confinement simultaneously as the vehicle occupant bumps against the inflated confinement; a bolt and nut securing said closure member to said outlet at one point and a pin disposed at another point circumferentially spaced from said bolt; said means for removing comprising an electrically actuable detonation element provided in said bolt and explosible in response to triggering of said safety device, and said detonation element including explosion delaying means for delaying the time of explosion of said detonation element until said predetermined time.

2. In a vehicle safety device of the type having an inflatable confinement normally stored in a collapsed and unexpanded condition, an impact sensing switch closed in response to a predetermined deceleration condition of the vehicle and actuable inflating means for inflating said confinement with a fluid to an expanded position between the vehicle and an occupant of the vehicle at the instant when the impact sensing switch is closed, apparatus for exhausting the fluid from the confinement after the fluid inflates said bag and an occupant impacts against the inflated confinement, said apparatus comprising an exhaust duct communicating with said confinement for exhausting said fluid from said inflated confinement, closure means removable secured to said exhaust duct for releasably closing said exhaust duct and preventing said fluid from exhausting through said exhaust duct, removing means responsive to the closure of the impact sensing switch for removing automatically said closure means from said exhaust duct at a predetermined time after the impact sensing switch closes to effect opening of said exhaust duct, said closure means comprising a closure member secured to the exhaust duct, fastening means removably securing said closure member, and said removing means comprising an electrically actuable detonation element ignitable upon closure of said impact sensing switch and having means for delaying the time of explosion to said predetermined time, said detonation element upon explosion breaking said fastening means for removing said closure member away from the exhaust duct.

* * * * *